Jan. 31, 1933.                C. W. WILLIAMS                1,895,597
                        AUTOMATIC FLUSHING DEVICE
                           Filed June 18, 1928

INVENTOR.
CHARLES W. WILLIAMS

BY John L. Milton
ATTORNEYS.

Patented Jan. 31, 1933

1,895,597

UNITED STATES PATENT OFFICE

CHARLES W. WILLIAMS, OF LOUISVILLE, KENTUCKY, ASSIGNOR TO AMERICAN AIR FILTER COMPANY, INC., OF LOUISVILLE, KENTUCKY, A CORPORATION OF DELAWARE

AUTOMATIC FLUSHING DEVICE

Application filed June 18, 1928. Serial No. 286,276.

The present invention relates to an improvement in filters more particularly of the type in which the filtering media are periodically coated with a viscous material. Particles of impurities in an air stream passing through said filter impinge upon the filtering media and are accumulated on the viscous coating. These accumulations are periodically removed by flushing or drenching the filtering media with a cleansing liquid.

One object of the present invention is to provide an efficient and inexpensive device for slowly or gradually collecting a supply of flushing or drenching liquid and automatically and rapidly discharging the same to produce a gushing or drenching effect against or upon the filtering surfaces of the filtering media.

Figure 1:
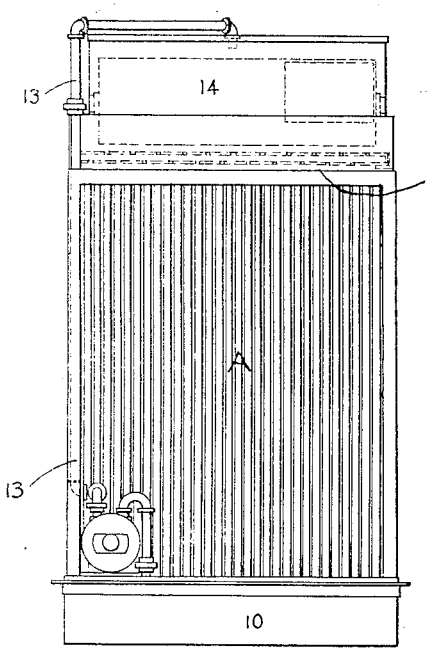
Figure 2:
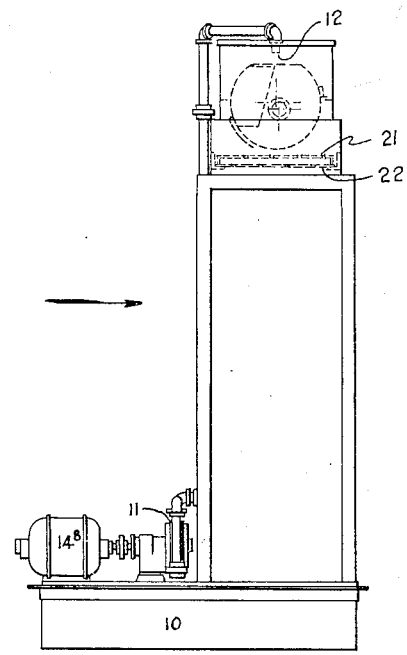
Figure 3:
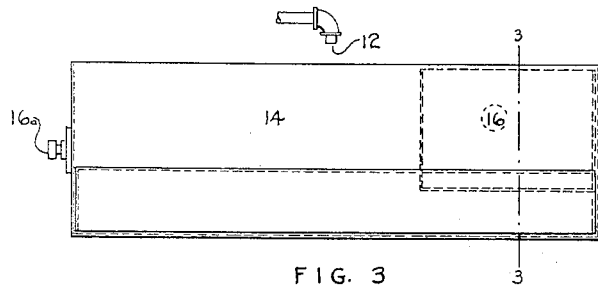
Figure 4:
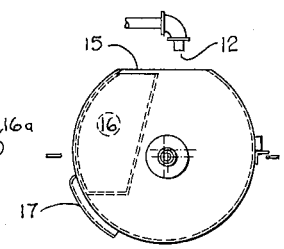
Figure 5:
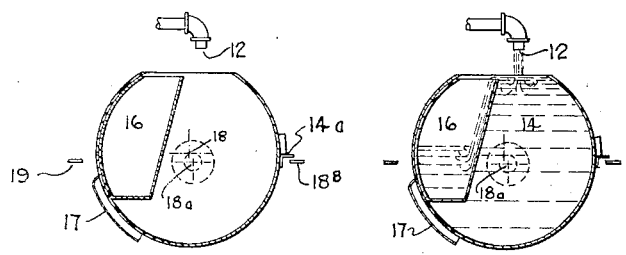
Figure 6:
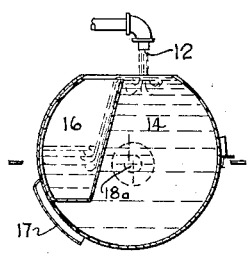
Figure 7:
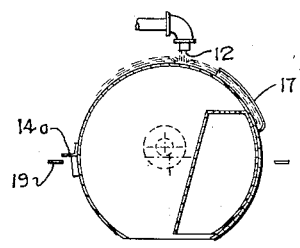

One embodiment of my invention is shown in the accompanying drawing in which:

Figure 1 is a front elevation of an apparatus employing my improved flushing device;

Figure 2, a side elevation of the apparatus shown in Figure 1;

Figure 3, a front elevation of a rotary tank showing auxiliary compartments and a liquid supply pipe;

Figure 4, an end elevation of the tank shown in Figure 3;

Figure 5, a cross sectional view on line 3—3 of Figure 3 with the tank shown in liquid receiving position;

Figure 6, the same as Figure 5 except that liquid is shown flowing into the main compartment and overflowing into an auxiliary compartment; and Figure 7, a cross sectional view of the tank in its inverted position and with a supply pipe feeding liquid into the second auxiliary tank.

In Figures 1 and 2 a conventional filter or air purifying device is illustrated with a filtering unit or group of filtering media A exposed in filtering relation to a stream of air, the direction of which is indicated by the arrow in Figure 2. At the bottom of this unit is a liquid supply tank 10 from which a pump 11 elevates cleansing liquid to an outlet or discharge nozzle 12 of pipe 13. This pump is actuated by a motor 14b which starts and stops at intervals determined by operation of a suitable timing device, not shown, but which may be one of many types well known in this and other arts. A dumping tank 14, preferably cylindrical in form, is provided with an opening 15 and is mounted on trunnions 16a preferably eccentrically located as at 18a the true center being shown at 18. Said tank 14 is provided with an interiorly disposed wall, forming with a wall of the tank proper a separate compartment 16. An exteriorly disposed wall forms with a wall of the tank an exterior auxiliary tank or compartment 17. As indicated in Figure 6, the compartment 16 is located with its opening at one side of the path of liquid flowing from the liquid supply outlet 12 but in position to receive the overflow of liquid from the main compartment of tank 14 into which liquid flows directly from the outlet 12. A finger or detent 14a is attached to tank 14 in position to engage a fixed stop 18b, Figure 5, to limit the extent of rotation of tank 14 and to retain the same in normal liquid receiving position. A stop 19 is arranged at the opposite side of tank 14 and in position to be encountered by the finger or detent 14a when the tank is rotated in discharging direction and to retain the tank in discharging position until it is again rotated as hereinafter described.

During the operation of filling the main compartment of tank 14, the latter remains in a normal, upright or liquid receiving position until the liquid in said main compartment overflows and practically fills the auxiliary compartment 16. This causes an unbalanced condition of the tank 14 whereupon the tank rotates rapidly to inverted position and rapidly discharges its liquid contents from both compartments while occupying the position in Figure 7. The described operation of tank 14 has no direct effect upon the flow of liquid from the outlet 12. Accordingly, as long as the pump is supplying liquid to said outlet, the latter will fill the compartment as above described and will also continue to discharge liquid to fill the auxiliary compartment 17 after the main compartment has been discharged and while the tank occupies the position shown in Figure 7. As soon as the weight of liquid in compartment 17 upsets the balance of tank 14 in its inverted poised position, the tank is caused to return to normal liquid receiving position as shown in Figure 6. This cycle of operation may be continued until the flow of liquid has been interrupted by operation of the controlling mechanism to stop the pump actuating motor hereinabove referred to, thus halting the flow of liquid from tank 10 to tank 14.

In the complete filter unit, as illustrated in Figures 1 and 2, a housing 20 is positioned in relation to the tank 14 to direct and guide the stream of liquid therefrom towards the filter media A. To effect a more even distribution of the discharged liquid and to prevent said liquid from splashing out beyond the upper edge of the housing, perforated baffle plates 21 and 22 are provided between said tank and the filtering unit, substantially as illustrated, to form with the housing 20 in effect a stationary intermediate distributing receptacle or tank having a perforated bottom.

In setting forth fully the details of an illustrative embodiment of my invention in the foregoing specification, I do not intend to limit the scope thereof except to the extent imposed by the attached claims, it being apparent that many variations or equivalents may be substituted for the specific elements shown without departing from the spirit of my invention. I contemplate, for example, that effective results may be obtained in connection with the operation of filtering devices and the cleaning thereof by the use of a delicately balanced tank utilizing two liquid receiving compartments proportioned and disposed to effect both the dumping and the return movement of the tank, although, in my specification and drawing, the tank 14 as a complete unit utilizes three compartments.

I claim:—

1. A filter comprising a filtering unit, a tank adapted to hold a supply of unit cleaning liquid, a distributing receptacle positioned between said tank and said unit and having outlet openings directed towards said unit, and means for actuating said tank to dump the liquid contents thereof into said receptacle.

2. A filter comprising a filtering unit, a rotatable tank adapted to hold a supply of unit cleaning fluid above said unit, a distributing receptacle positioned between said tank and said unit and having outlet openings directed towards said unit, and means for rotating said tank to dump the contents thereof into said receptacle.

3. In a gas purifying device, a housing, filtering media disposed therein and adapted to be cleansed by a liquid flushing thereover, an elevated tank, means for dumping the contents thereof over said media, and means interposed between said tank and media for distributing the dumped liquid.

4. A filter comprising a filtering unit, a tank mounted for movement from an upright position, wherein it receives a liquid, to inverted position, wherein it dumps the liquid over the unit, and an auxiliary tank associated with the main tank and adapted, when the main tank is in liquid receiving position, to receive liquid from the main tank as it fills and ultimately to overbalance it and thereby cause its movement to the dumping position.

5. A filter comprising a filtering unit, a tank mounted for movement from an upright or liquid receiving position to an inverted or dumping position, means for dumping said tank, and means for returning it to its upright position, said return means including an auxiliary tank offset from the center of the main tank and positioned to receive liquid when the main tank is inverted.

In testimony whereof I affix my signature.

CHARLES W. WILLIAMS.